July 3, 1962 W. MAYER 3,042,761
CURRENT COLLECTOR FOR ELECTRIFIED TROLLEY SYSTEMS
Original Filed May 14, 1954 2 Sheets-Sheet 1

INVENTOR.
WILBUR MAYER
BY Dillon S. Turney
HIS ATTORNEY

July 3, 1962 W. MAYER 3,042,761
CURRENT COLLECTOR FOR ELECTRIFIED TROLLEY SYSTEMS
Original Filed May 14, 1954 2 Sheets-Sheet 2
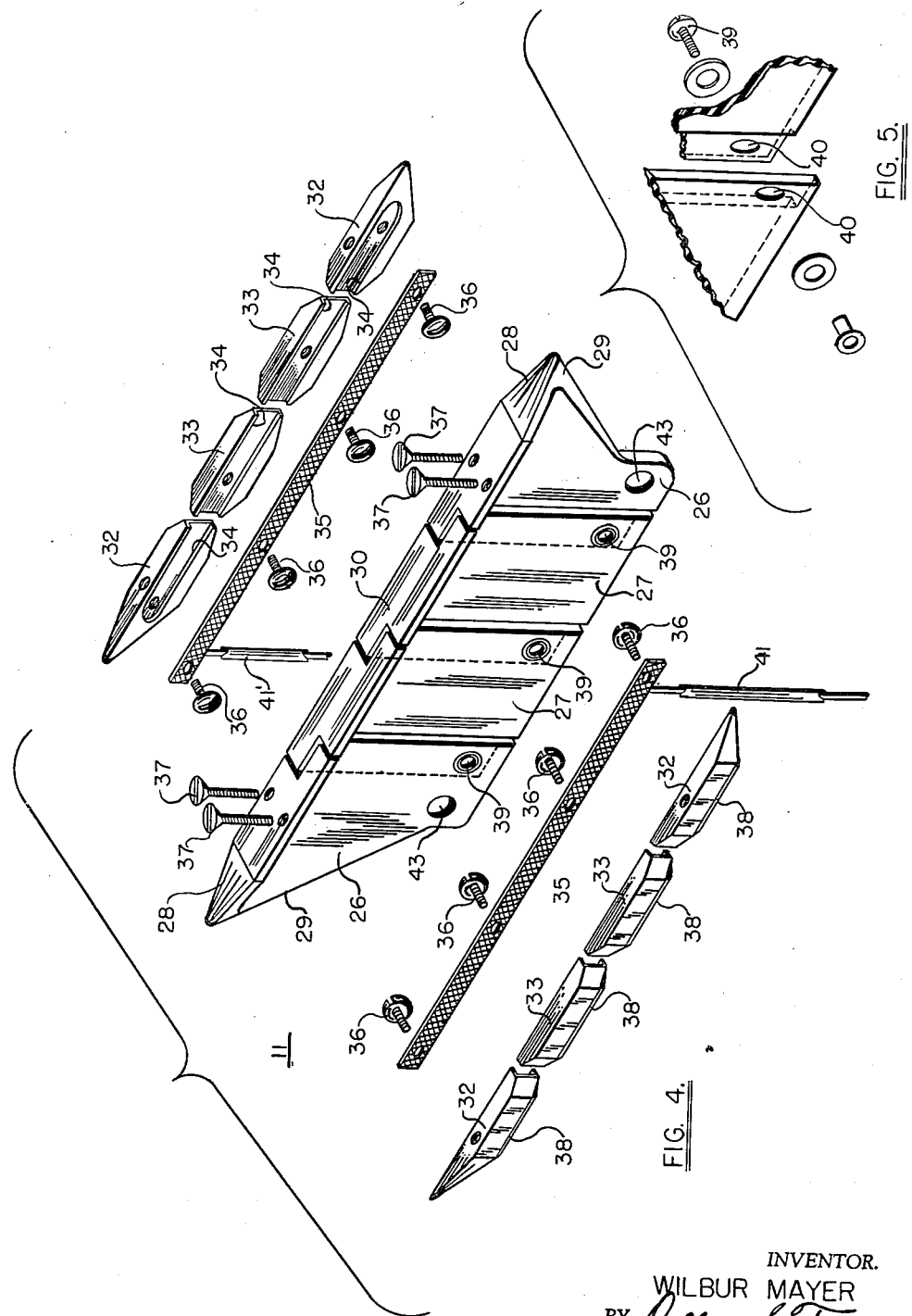
INVENTOR.
WILBUR MAYER
BY Dillon S. Turney
HIS ATTORNEY

United States Patent Office 3,042,761
Patented July 3, 1962

3,042,761
CURRENT COLLECTOR FOR ELECTRIFIED TROLLEY SYSTEMS
Wilbur Mayer, Fairfield, Iowa, assignor to The Louden Machinery Company, Fairfield, Iowa, a corporation of Iowa
Original application May 14, 1954, Ser. No. 429,827, now Patent No. 2,918,540, dated Dec. 22, 1959. Divided and this application Nov. 28, 1958, Ser. No. 777,546
4 Claims. (Cl. 191—59.1)

My invention relates in general to electrified trolley systems and more particularly to an enclosed electric current conducting track and an articulated current collector for use therewith. This application relates to the trolley and current collector construction and is a division of copending application Serial #429,827 filed May 14, 1954, now Patent No. 2,918,540 dated Dec. 22, 1959, for "Enclosed Electrified Track and Current Collector."

In the design of overhead conveyor systems and other forms of electrical apparatus where it is necessary to take power from a continuous track by means of a travelling collector, such as are commonly used in electric conveyors, travelling cranes and hoists, a wide variety of constructions have been known and tried. However, certain disadvantages and inherent faults have persisted in spite of numerous attempts to solve these problems. It has been difficult to devise a track construction that is easily and economically manufactured, simple to erect, and which is effectively enclosed so that the current carrying parts are not a hazard to personnel working around the electrified track. Another serious disadvantage has been the difficulty in designing a track and current collector which will permit track joints, curves and sharp bends in the track to be easily negotiated by the collector without derailment, loss of contact and excessive arcing at such points, and without binding or sticking of the collector as it passes thorugh such curves and joints in the track. Furthermore, the design of a track system, which permits switching from one track to another, has been difficult as the switches are a prime source of derailments and current interruptions.

The arrangement that forms the subject matter of this invention incorporates a number of novel features, including a two-part preformed track which is easily and cheaply manufactured and quickly erected to fit any desired installation irrespective of configuration, length or curvature and in which the electrified track sections are substantially totally enclosed and insulated, thereby providing a maximum of safety for personnel working around the installation. Cooperating with, and supported within, the track is a novel form of articulated current collector which, due to its construction, easily negotiates track section joints, switches, curves and irregularities in alignment of the track without any binding or sticking at such points. The design of the system is such that derailment of the collector is impossible under normal operation and when passing through section joints and in switching from one track to another. The current collecting shoes incorporated in the collector are floating and articulated, and are positioned thereon so that a plurality of contacts is made with the track at all times, thereby insuring continuous current pickup and minimum arcing. In addition, the angular position of the contact faces is such that a wiping or cleaning action is present during operation, thereby maintaining the track and collector shoe surfaces bright and clean and minimizing arcing or sparking when carrying heavy load currents.

It is, therefore, an object of this invention to provide an improved enclosed trolley electrification system for conveyors, cranes and the like.

It is another object of this invention to provide an enclosed current carrying track which may be used for transmission of direct current or alternating current of one, two or three phases, and in which the current conducting surfaces are maintained in clean condition by the wiping action of the current collecting shoes.

It is another object of this invention to provide an articulated current collector which cooperates with an enclosed current carrying track and which carries a plurality of floating contact shoes arranged to maintain electrical contact at all times irrespective of track joints, curvature and other irregularities in the track installation.

It is still another object of this invention to provide a flexible jointed current collector which is supported by and travels inside of an enclosed electrified track, which collector is jointed in a plurality of places and capable of universal movement so that it closely and continuously follows the current carrying track in which it is supported.

Other objects and advantages will be apparent from a description of the subject invention, and the invention will be better understood from the following detailed description thereof taken in connection with the accompanying drawings and its scope will be pointed out in the appended claims.

In the drawing, FIGURE 1 shows an elevation view, partially in section, of the enclosed current carrying track with the articulated current collector in place in the track.

FIGURE 4 is an exploded perspective view of the current collector showing in detail the assembly and construction thereof.

FIGURE 5 is an exploded detail in perspective of an end portion of the current collector shown in FIGURE 4 and showing the method of articulation of the end segments of said collector.

Figure 1:
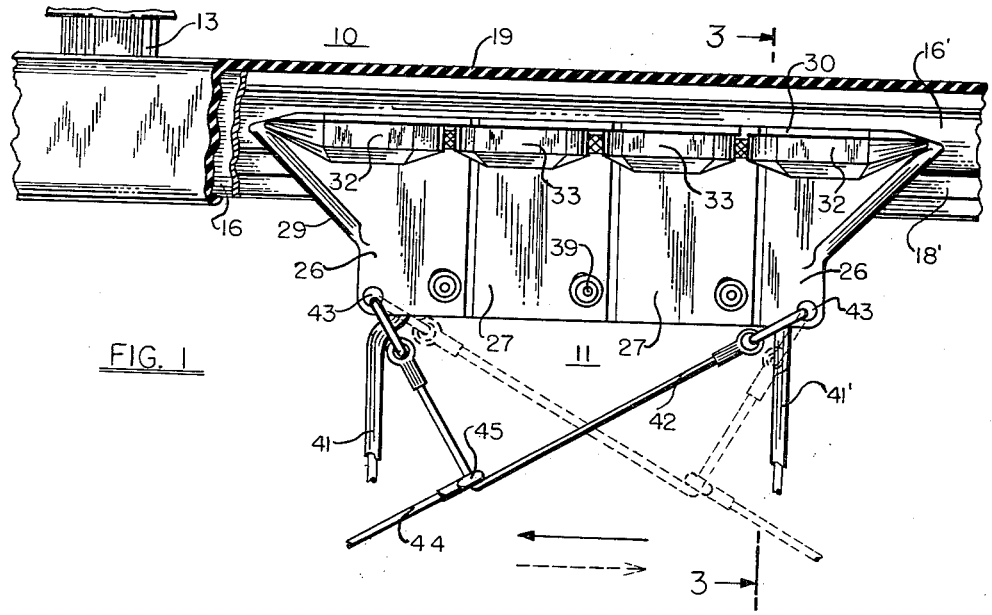

Referring now to FIGURE 1 of the drawing, I have shown a section of track indicated generally at 10 in which the articulated current carrying collector 11 is supported for longitudinal movement inside of the track. The track is supported at spaced intervals as necessary by means of suitable suspension brackets or hangers from the overhead or building structure (not shown) to which suspension electrical insulators, such as 13, are secured. For a better understanding of the construction, assembly and mounting of the track per se, reference should be had to my copending application hereinbefore referred to.

Figure 3:
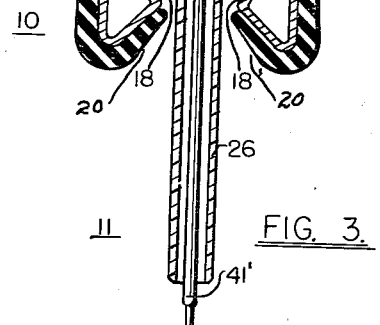
FIGURE 3 is a sectional view taken along the line 3—3 of FIGURE 1 showing a cross section of the current collector positioned in the track.

The track itself consists of two identically formed rails or sections 16 and 16' which are preferably formed of sheet metal and provided at their upper edges with the inwardly and downwardly turned flanges 17 and 17', and at their lower edges with the reentrant triangularly shaped cross sections 18 and 18' respectively. Thus, it will be seen from FIGURES 1 and 3 that when the current carrying track sections or rails 16 and 16' are maintained in rigid spaced relationship, the inner angular surfaces 18 and 18' of the track sides form the current conducting surface from which current is collected by means of the movable collector 11. In order to remove the hazard of contact with the current carrying track sections 16 and 16', a performed shield or sheath of insulating material 19, such as rubber or plastic, extends around the outer periphery of the track assembly and fits snugly to the assembly, the reentrant portions 20 and 20' extending upwardly into the open throat of the assembled track. Thus a complete protective covering surrounds the track thereby making it extremely difficult for personnel to come in contact with live current carrying parts, or for metallic objects to accidentally contact the track causing short circuits.

For a description of the current collector designed to cooperate with the enclosed track just described, reference should now be made to FIGURE 4 in which an exploded perspective view of the articulated collector is shown. The collector 11 comprises a plurality of insulating segments which obviously can be of any desired number depending on the amount of current required to be transmitted and the degree of flexibility required on account of curvature of the track. In the embodiment shown, the collector 11 consists of a pair of pointed or tapered end sections 26 and a pair of intermediate sections 27. It will be noted that the end sections 26 are identical and are bevelled in a transverse direction to a point along their leading edge 28 and also bevelled in a vertical direction along the leading edge 29, thereby enabling the end section 26 to guide the collector 11 through the track. Since the end sections 26 are identical, the collector is thus able to operate in either direction in the track.

It will be noted that each of the segments 26 and 27 is of T-shaped cross section having a head portion 30 extending each side of the center line, the under surface of said head portion 30 serving as a bearing surface for the metallic current collecting shoes 32 and 33.

The current collecting shoes 32 and 33 are preferably formed of copper, an alloy thereof, or other suitable current collecting material, and each current collector shoe is provided with a channel or inset 34 on its inner side into which is fitted a flexible conducting braid 35. The shoes are secured to the braid 35 by means of the screws 36, all as shown in FIGURE 4. The end shoes 32 which are tapered to conform to the end segments 26, are bolted to the end segments 26 by tap screws 37 which extend downwardly through the head portion 30 of the segments and into the upper surface of the shoes 32. Thus only the end collecting shoes 32 are rigidly attached to the end collector segments 26, and the intermediate shoes 33 are floating, being supported only by the flexible metallic braid 35. This construction insures that at all times at least a number of the multiple collecting shoes will be in contact with the conducting surface of the track and arcing and current interruptions will be eliminated. The actual electrical contact between the track 10 and collector 11 is made by the bevelled surface 38 which forms the lower outer edge of each of the collector shoes 32 and 33. The position of the collector segments and the current collecting action will be clearly understood from references to FIGURE 3 which shows the bevelled edges 38 of the collector shoes in contact with the angled inner surfaces 18 and 18' of the track side rails. In the drawing this is shown to be approximately a 45 degree angle with respect to the vertical. However, it should be understood that other similar angles may be used and it will be apparent that this construction insures that the end segments 26 and the intermediate segments 27 are forced inwardly and away from the side rails 16 and 16', thereby contributing to the free movement of the collector through the track.

Articulation and flexibility of the collector is obtained by the use of the multiple segments 26 and 27 which are loosely connected at their lower edges as seen in FIGURES 4 and 5 by means of screws or rivets 39, which extend through the elliptical matching holes 40 in the lower corners of the insulating segments 26 and 27. Thus a limited amount of vertical movement of one segment with respect to another is permitted as well as angular deviation of individual segments from the longitudinal center line of the collector is possible. This construction results in an extremely flexible articulation and permits, in effect, curving or bending of the collector assembly so that it will satisfactorily negotiate curvatures and misalignments in the track.

The power current which is picked up by means of the collector shoes 32 and 33 is conducted to the conveyor, hoist or other apparatus the collector is to be used with by means of the electrical lead wires 41 and 41'. Thus, in FIGURE 3 it will be noted that the conductor 41 is connected to the left-hand set of collector shoes by means of the braid 35, which in turn pick up current from the track section 16 and its inclined surface 18, whereas the conductor 41' extends downwardly through the end segment 26 and its associated collector shoes pick up power from the opposite track section 16' and its inclined contact surface 18'. This arrangement, using two current carrying rails, is suitable for direct current or single-phase alternating current, and by using the grounded load supporting run-way or track for the crane (not shown) for a third circuit, it is possible to transmit two or three phase alternating current with the same construction as previously described.

From experience, it has been found that it is desirable to pull or draw the collector 11 along the track by means of a flexible yoke or loop 42, as seen in FIGURE 1, which is formed of flexible material and is connected at each end to apertures 43 at the lower corner of each end segment 26. The towing cord 44 is equipped with an eye 45 at the end through which the loop 42 passes, and this arrangement permits the collector to be operated in either direction, as shown by dotted lines and directional arrows in FIGURE 1 without any changes being required. This arrangement applies most of the towing force to the rear end of the collector 11 with respect to its direction of movement and, at the same time, imposes a lesser downward force on the forward end of the collector thereby maintaining both ends of the collector in contact with the track and insuring that the articulated collector will follow the track throughout curvatures, switches and section joints in the track.

Figure 2:
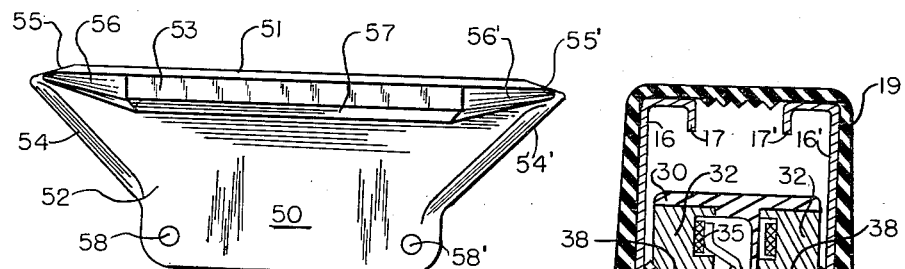
FIGURE 2 is an alternate form of the current collector as shown in FIGURE 1.

FIGURE 2 shows an alternate or modified form of a current collector designed for use with the track forming a part of this invention and may be successfully used where the track installation has no relatively sharp curvatures or short radii. In the alternate form as shown in FIGURE 2, the articulated or jointed segment feature of the collector has been dispensed with and an integral one-piece collector body 50 is utilized. The body 50 is formed in a T shaped cross section having a head portion 51 and a vertical body portion 52. A current collecting contact shoe 53 is disposed on each side of the upright portion 52 and lies immediately underneath the head portion 51 of the main body member. As in the case of the articulated or jointed current collector previously described, each end of the collector body 50 is provided with an upwardly tapered leading edge 54 and 54' and these leading edges are bevelled inwardly to a point in the same manner as shown with the articulated collector. The head portion 51 is also bevelled or tapered to a point at each end, as shown at 55 and 55'. The contact shoe 53 is also provided with a tapered surface at each end 56 and 56' and the lower outermost edge 57 of the collector shoe 53 is bevelled to approximately the same angle as that provided by the conducting surfaces 18 and 18' of the current carrying track. Thus, in all respects, the modified form of collector as just described in connection with FIGURE 6 operates in an identical manner to the articulated collector 11, however, it is much simpler and less expensive to manufacture and will give equally good results where the curvature of the track is such that a one-piece rigid collector as shown will negotiate the turns and switches. The collector shown in FIGURE 2 is provided with apertures 58 and 58' at each end of its lower edge so that any desired type of towing harness or attaching loop may be secured to either or both ends of the collector. The electrical current may be taken from the current collecting shoes 53 by any convenient pair of lead wires (not shown) in a manner similar to that shown in FIGURES 3 and 4.

The drawings have illustrated a preferred form of the collector in which two intermediate segments 27 are flexibly joined between the two leading segments 26. However, this is illustrative only and it will be obvious that a greater or lesser number of articulated segments and a corresponding number of collector shoes may be utilized depending upon the amount of current necessary to be transmitted and to a lesser degree, upon the amount of curvature in the track 10. As pointed out previously, a rigid one piece collector, as described in connection with FIGURE 2, can be successfully used in many applications.

It is also apparent that the current carrying track, when used with this articulated current collector with its flexible towing connection, does not require accurate spacing from the actual load carrying conveyor or crane track since considerable latitude in transverse spacing is permissible. It has also been found that the sliding and wiping action of the bevelled contact shoe faces 38 as they pass along the corresponding inclined current carrying surfaces 18 and 18' of the track, results in both surfaces being mantained clean and free of dirt or corrosion. At the same time, the weight of the collector assembly plus the downward pull exerted by the tow cord 44 is not sufficient to cause undue wearing of these current transferring surfaces.

In summarizing, it should be emphasized that the chief advantage of this system is its reliability and freedom from derailment. Due to the enclosing nature of the track, it is virtually impossible to force the collector out of the track, and the collector construction, with its tapered leading edge and self-centering features, prevents binding, freezing or jamming within the track even when substantial misalignment of the track at section joints or switch points occurs.

While I have shown and described a particular embodiment of my invention, it will be apparent to those skilled in the art that certain changes and modifications may be made therein without departing from my invention in its broader aspects and I, therefore, aim in the appended claims to cover any such modifications as may be made without departing from the true spirit and scope of this invention.

What I claim as new and desire to secure by Letters Patent of the United States is:

1. A movable current collector assembly for operation with a continuous length of electrified track comprising, a plurality of longitudinally aligned articulated T-shaped insulating segments, a pair of spaced end segments each having a tapered leading edge, a flexible current conducting member secured at each end thereof to said end segments and disposed along each side of said T-shaped segments, and a plurality of current collecting contact shoes secured to each of said flexible members, each of said contact shoes having an outwardly facing angularly disposed contact surface.

2. A movable current collector assembly for operation with a continuous length of electrified track comprising, a plurality of articulated T-shaped insulating segments, a flexible current conducting member supported by said T-shaped segments and extending along each side of said T-shaped segments, a plurality of current collecting contact shoes secured to each of said flexible members, each of said contact shoes having an outwardly facing angularly disposed contact surface, and a flexible towing loop secured to a pair of said T-shaped segments for drawing said collector assembly in either direction.

3. A slidable current collecting carriage for use with a continuous length of electrified track comprising, a series of articulated insulating segments longitudinally aligned and connected together with lost motion pivot means at their lower edges, said series including a segment at each end having a tapered leading edge, a flexible current conducting member extending between and secured to said end segments, a plurality of current collecting contact shoes spaced along said flexible member and secured thereto, and means for towing said carriage in either direction, said means including a flexible loop attached at each end thereof to said tapered end segments.

4. A slidable current collecting carriage for use with a continuous length of electrified track comprising, an assembly of articulated T-shaped insulating segments longitudinally aligned and loosely pivoted together at their lower edges, said assembly including an end segment at each end thereof having a pointed and tapered leading edge, a flexible current conducting member extending alongside each side of said assembly and secured to each end thereof to said end segments, a plurality of current collecting contact shoes disposed along each of said flexible members and secured to the outer side thereof, said contact shoes being provided with outwardly facing angularly disposed contact surfaces, and means for towing said carriage in either direction said means including a flexible loop attached to said end segments.

References Cited in the file of this patent

UNITED STATES PATENTS

| 817,846   | Greenwood | Apr. 17, 1906 |
| 884,630   | Bauer     | Apr. 14, 1908 |
| 977,224   | Robinson  | Nov. 29, 1910 |
| 2,005,908 | Schaake   | June 25, 1935 |
| 2,700,705 | Anjeskey  | Jan. 25, 1955 |
| 2,728,819 | Hauss     | Dec. 27, 1955 |

FOREIGN PATENTS

| 4,162 of 1882 | Great Britain | Aug. 31, 1882 |
| 355,567 | Great Britain | Aug. 27, 1931 |
| 239,873 | Switzerland | Mar. 1, 1945 |